United States Patent
Brunet et al.

(10) Patent No.: US 6,595,426 B1
(45) Date of Patent: Jul. 22, 2003

(54) METHOD OF MANUFACTURING AN ELECTRONIC DEVICE HAVING A CHIP AND/OR AN ANTENNA, AND A DEVICE OBTAINED BY IMPLEMENTING THE METHOD

(75) Inventors: Olivier Brunet, Marseilles (FR); Laurent Oddou, La Ciotat (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/541,501

(22) Filed: Apr. 3, 2000

Related U.S. Application Data

(63) Continuation of application No. PCT/FR98/02121, filed on Oct. 5, 1998.

(51) Int. Cl.⁷ .................................. G06K 19/00
(52) U.S. Cl. ......................... 235/487; 235/492
(58) Field of Search ................ 235/487, 492; 340/10.1–10.6; 438/106–127

(56) References Cited

U.S. PATENT DOCUMENTS

| | | | | |
|---|---|---|---|---|
| 4,583,099 A | * | 4/1986 | Reilly et al. | 343/895 |
| 4,682,927 A | * | 7/1987 | Southworth et al. | 414/217 |
| 4,865,875 A | * | 9/1989 | Kellerman | 427/96 |
| 5,442,334 A | * | 8/1995 | Gallo et al. | 340/572.3 |
| 5,528,222 A | * | 6/1996 | Moskowitz et al. | 340/572.7 |
| 5,599,046 A | * | 2/1997 | Behm et al. | 283/83 |
| 5,979,941 A | * | 11/1999 | Mosher, Jr. et al. | 283/67 |
| 6,027,027 A | * | 2/2000 | Smithgall | 235/488 |
| 6,065,701 A | * | 5/2000 | Tanimura et al. | 242/344 |
| 6,094,138 A | * | 7/2000 | Eberhardt et al. | 340/572.1 |
| 6,104,311 A | * | 8/2000 | Lastinger | 340/825.54 |
| 6,109,530 A | * | 8/2000 | Larson et al. | 235/492 |
| 6,121,553 A | * | 9/2000 | Shinada et al. | 174/259 |
| 6,130,602 A | * | 10/2000 | O'Toole et al. | 340/10.33 |
| 6,259,408 B1 | * | 7/2001 | Brady et al. | 343/700 MS |
| 6,280,544 B1 | * | 8/2001 | Fox et al. | 156/249 |

FOREIGN PATENT DOCUMENTS

| | | |
|---|---|---|
| EP | 0376062 A1 | 7/1990 |
| EP | 0698859 A1 | 2/1996 |
| JP | 06268434 | 9/1994 |
| JP | 07276605 | 10/1995 |
| JP | 08216573 | 8/1996 |

\* cited by examiner

*Primary Examiner*—Karl D. Frech
*Assistant Examiner*—Jamara A Franklin
(74) *Attorney, Agent, or Firm*—Burns, Doane, Swecker & Mathis, L.L.P.

(57) ABSTRACT

The disclosed invention relates to a method of manufacturing an electronic device having a chip and/or an antenna, such as a contactless or hybrid or label chip card. The electronic device includes at least one decorative sheet having a visible outer face, and at least one interface comprising an antenna. The method includes a step in which the antenna is formed on that face of the decorative sheet which is opposite its visible outer face by screen-printing using a conductive ink. The invention also relates to the resulting electronic device.

20 Claims, 2 Drawing Sheets

PRIOR ART
FIG.1
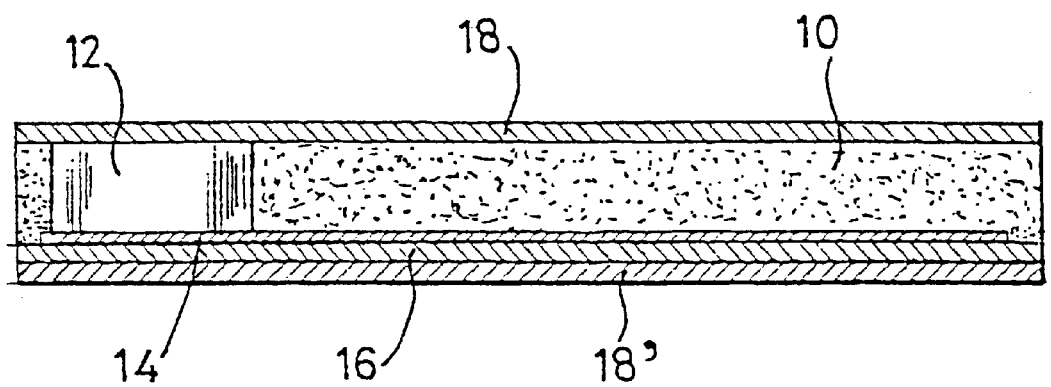
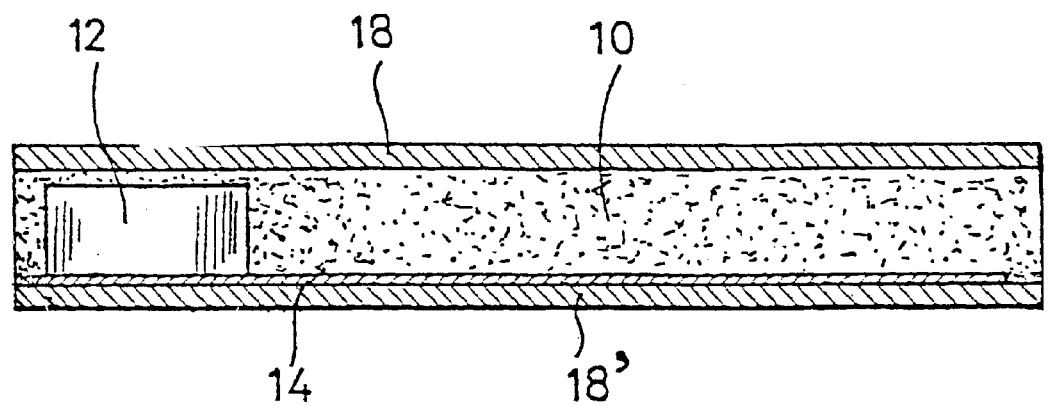
FIG.2

METHOD OF MANUFACTURING AN ELECTRONIC DEVICE HAVING A CHIP AND/OR AN ANTENNA, AND A DEVICE OBTAINED BY IMPLEMENTING THE METHOD

This disclosure is based upon, and claims priority from, French Patent Application No. 97/13734, filed Oct. 3, 1997, and is a continuation of PCT Application No. PCT/FR98/02121, filed Oct. 5, 1998, the contents of which are incorporated herein by reference.

1. Field of the Invention

The present invention relates to a method of manufacturing an electronic device having a chip and/or an antenna, such as a contactless or hybrid or label chip card, of a type in which the electronic device includes at least one decorative sheet having a visible outer face, and at least one interface comprising an antenna.

2. Background of the Invention

A chip card or "smart card" generally comprises: firstly a chip or chip module which is contained at least in part in an insulating substrate, e.g. a layer of thermoplastic material, and which is connected to a planar antenna constituting an interface; and secondly two decorative outer sheets which are made of a thermoplastic material and are disposed on either face of the chip card, and which can bear inscriptions or logos. Where applicable, a protective film or "overlay", such as a varnish, covers the outer sheets.

Currently, the antennas used for contactless cards are of different types. A first type of such an antenna is formed on a specific intermediate backing sheet by copper etching using the printed circuit technique. It is then inserted between a protective outer sheet and the chip or module. The chip card is generally obtained by rolling or injection-molding during which the various sheets of thermoplastic material are bonded together and/or to the substrate.

Such an intermediate antenna backing sheet generates an extra thickness of about 130 microns, which makes it difficult to comply with the maximum thickness of 840 microns set by the relevant ISO Standard.

In addition, forming the antenna on the intermediate backing sheet constitutes an additional manufacturing step, which increases the manufacturing cost from the point of view both of materials and of time. Furthermore etching the antenna remains quite a costly operation.

A second type of such an antenna is constituted by a copper winding in air, the ends of the winding being connected to a chip or a module. The winding-and-module or winding-and-chip assembly is referred to as a "transponder".

In order to manufacture the card, the transponder is inserted between at least two thermoplastic sheets, or between two thermoplastic sheets and then embedded in an adhesive, and the resulting assembly is then rolled for laminating purposes. The difficulty of using such transponders for manufacturing cards of the "contactless" type arises from the handling problems encountered in picking up the transponders and depositing them accurately on the sheets of plastic. That problem lengthens the manufacturing cycle times.

The problem that lies behind the invention is to provide a contactless or hybrid chip card that is lower in cost while also offering good performance.

Among the antenna-forming techniques that are lower in cost, screen-printing using conductive ink is also known. Unfortunately, that technique is ill-suited for the field of chip cards, in particular contactless chip cards. Ink-drying and undulation problems arise.

The available inks dry at about 150° C., which is incompatible with the materials commonly used in the field of chip cards, such as PVC and ABS which have softening temperatures of about 60° C.

Other materials, such as PC and PET have higher softening temperatures, in the range approximately 120° C. to 130° C., that are still lower than the optimum drying temperature of such inks. However, those materials are more costly than PVC and ABS.

Screen printing on thin films or sheets of thickness less than about 600 µm and on the materials of chip cards also poses problems of surface undulation that is visible to the naked eye. Such undulations can be seen on the back of such a sheet, under the turns, and they constitute an appearance defect.

In addition, in order to make high-performance antennas, it is necessary to have the best possible conductivity that can be obtained, in particular by using wider turns and provided that good drying is achieved. The problem is that the area available for an antenna is limited because of the presence of an area reserved for embossing.

Furthermore, once such inks have dried, they do not all have sufficient bending strength compatible with the standards applicable to chip cards.

Because of the above-mentioned difficulties, the trend is not to use screen printing in the field of chip cards, in particular for forming conductor circuits having good conductivity on thin films, such as high-performance antennas.

An object of the invention is therefore to mitigate the above-mentioned drawbacks in order to make a chip and/or antenna electronic device that is low in cost.

SUMMARY OF THE INVENTION

To this end, the present invention provides a method of manufacturing an electronic device having a chip and/or an antenna, such as a contactless or hybrid or label chip card, said electronic device including at least one decorative sheet having an apparent outer face, and at least one interface including an antenna. The method includes a step in which the antenna is formed on that face of the decorative sheet which is opposite its visible outer face by screen-printing using a conductive ink.

This makes it possible to simplify the manufacturing cycle, thereby reducing the manufacturing cost significantly. In addition, by means of the invention, it is possible to omit the intermediate backing sheet, thereby making it possible to reduce the thickness of the card significantly, and/or to reserve space for accommodating chips or modules of larger thickness.

According to another characteristic of the invention, the sheet is provided with pre-printed graphics and/or with a transparent protective film on its apparent outer face.

This makes it possible to simplify the printing operation because it is performed on the protective sheet and not on the chip card assembly, thereby avoiding high cost due to printing rejects.

According to another characteristic, in order to form the antenna on the decorative sheet, the method includes the following steps:

a fine backing sheet is provided that is made of a material having a softening or degradation temperature that is lower than an optimum ink-drying temperature;

a conductive ink is provided that has a metal particle content lying in the range of approximately 60% to 95% in a polymer matrix and a solvent, said ink further having a predetermined optimum drying temperature; and after screen-printing said ink onto said backing sheet, the ink is dried partially at a temperature lower than the optimum drying temperature of the ink. The ink includes silver particles at a content lying in the range of 70% to 85%.

It is thus possible to obtain an antenna having acceptable performance by screen printing on materials used in the field of chip cards without them being degraded by the drying step.

According to another characteristic of the invention, a plurality of antennas are formed simultaneously on a decorative base sheet. The base sheet is then cut up to obtain a plurality of decorative sheets with their antennas. It is then possible to assemble the chip card. Manufacturing a plurality of protective sheets simultaneously makes it possible to obtain further reductions in manufacturing time and cost.

Advantageously, the table of the screen-printing machine is subjected to surface-smoothing treatment, such as anodization or coating with Teflon. This makes it possible to prevent scratches from forming on the printed face of the protective sheet.

According to yet another characteristic of the invention, the screen-printed sheet is dried in an oven, thereby making it possible to remove the solvent and to obtain a solid conductor tape made up of conductive particles and of a binder. Advantageously, a protective plate is simultaneously inserted between the meshed mat of the drying oven and the screen-printed sheet. This makes it possible to isolate the outer face of the protective sheet and to protect it from scratches or the like.

To this end, it is also possible to use a meshed mat that is made of a plastic material, a treated meshed mat, e.g. made of stainless steel, or else belts of plastic tape.

The invention also provides an electronic device having a chip and/or an antenna, such as a contactless or hybrid or label chip card, which device is obtained by implementing the method of the invention. It is distinguished in that it includes an antenna formed by screen-printing on the non-visible back of a decorative sheet.

According to one characteristic, the antenna includes turns of unequal widths between its connection ends. This makes it possible to increase the conductivity of a conductive ink or to compensate for its insufficient conductivity without giving rise to additional drawbacks, in particular due to drying.

BRIEF DESCRIPTION OF THE DRAWINGS

Other characteristics and advantages of the invention appear from the following description given by way of non-limiting example, and with reference to the accompanying drawings, in which:

FIG. 1 is a vertical cross-section view of a known type of chip card;

FIG. 2 is a vertical cross-section view of a chip card of the present invention;

DETAILED DESCRIPTION

Figure 3:
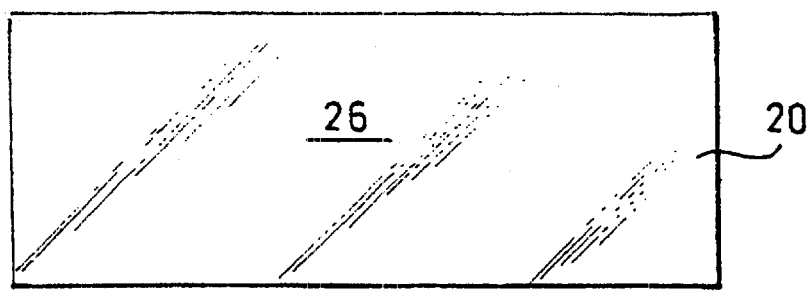
FIGS. 3 and 4 respectively show the front and the back of a base sheet before the screen-printing operation.
Figure 4:
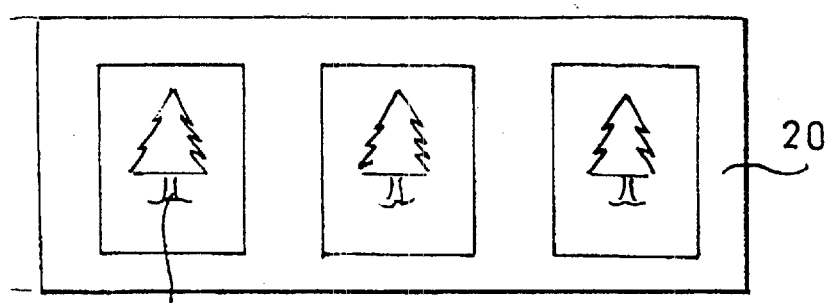

FIG. 1 shows a chip card of the "contactless" or "hybrid" type including a planar antenna constituting a contactless interface. It essentially comprises a substrate 10 such as a layer of insulating material, in which a chip or a module 12 is embedded, said chip or module being connected to an antenna 14 which is formed on an intermediate backing sheet 16. The resulting assembly is protected by two thermoplastic protective outer sheets 18 and 18'. Where applicable, a transparent protective film can cover the outer sheets.

The thickness of the substrate 10 with the chip or module 12 is, for example, about 400 microns, the thickness of the protective outer sheets 18 and 18' is about 200 microns, and the thickness of the intermediate sheet 16 with the antenna 14 is about 130 microns. The maximum thickness of the assembly is 800 microns, in compliance with the relevant ISO Standard.

FIG. 2 is also a longitudinal section view, but it shows a chip card according to the present invention. As can be seen, the chip card of the invention also includes a substrate 10 with its chip or module 12, and protective sheets 18 and 18'.

According to the invention, the antenna 14 is formed on the inside face of one of the protective sheets 18 or 18'. This makes it possible firstly to achieve a saving in thickness of about 150 microns. It is thus possible to manufacture chip cards of thickness lower than 800 microns if it is so desired.

Furthermore, there is one less sheet to be indexed, which saves material and time and thus reduces cost. In contactless chip cards, this makes it possible to omit the operation of depositing material over both faces of the intermediate sheet, or of drilling through the intermediate sheet to enable the resin to flow therethrough. As a result, a considerable saving in cycle time is obtained.

By means of the invention, it is possible to reduce the thickness of the card at the chip or at the module for a contactless card. Since the interface between the chip or the module and the antenna is further from the center of the chip card, then, for a given chip or module thickness, the thickness of the card in the chip or module zone is controlled better in the card of the present invention. In particular, the hard spots of the card are further away from the protective outer sheets.

The invention also makes it possible to use chips or modules that are thicker, and therefore, for example, to omit the thickness-reducing or "backlapping" operation that otherwise needs to be performed, e.g. by milling.

Finally, the invention makes it possible to avoid printing defects when the protective sheet is not preprinted, but rather is delivered blank and printed after the card has been manufactured.

Advantageously, as shown in FIGS. 3 to 6, a plurality of (e.g. three) antenna backing sheets are formed simultaneously on a thermoplastic base sheet 20. On its outer face 22, the base sheet has three logos 24 pre-printed on it, and, on its inside face 26, three antennas 28 are formed by screen printing. This base sheet is then cut up to obtain three protective antenna backing sheets. This makes it possible to reduce the manufacturing cost, in particular by omitting the operations of putting preprinted protective sheets in place.

The chip card of the present invention may be manufactured as follows:

Three logos 24 are printed on the rear face of the thermoplastic base sheet 20. The resulting printing may optionally be protected by rolling a protective layer or "overlay" or by applying a varnish.

Naturally, if "blank" chip cards (i.e. cards with no printing) are to be manufactured, this initial operation is omitted. The antennas are then formed.

According to the invention, an electronic device having a chip and/or an antenna, and such as a contactless or hybrid or label chip card, including a decorative sheet having a visible outside face (18, 18') and at least one interface comprising an antenna (14, 28) is manufactured by implementing a method that includes the following essential step.

In this step, the antenna is formed on that face of the decorative sheet which is opposite the visible outer face by screen-printing using a conductive ink.

It is thus possible to obtain a base elementary device constituted by a decorative sheet or a sheet suitable for receiving printing and including at least one antenna. Other conductor elements may be formed in the same manner. Electronic elements, in particular a chip or a chip module may be subsequently connected and/or coated.

The method may further include a step in which at least one layer of insulating material is disposed on said opposite face so as to cover the antenna at least in part. As a result, an electronic device, in particular of the chip card type, is obtained. Additional protective films may also be added.

The layer of insulating material may be formed in various manners, and in particular by hot-rolling or cold-rolling a second sheet onto said opposite face or by injection-molding or sputtering.

The interface constituted by at least one antenna and/or contacts may be connected to a chip or a chip module before or after the layer of insulating material is formed. In this case the connections of the antenna can be accessible either by reserving an access or by machining an access.

The decorative sheet is made of a polymer material, but it may optionally be formed on any other degradable or deformable material, such as a sheet of paper.

In an implementation of the method, the preprinted sheet is placed on the table of a screen-printing machine, e.g. of the MPM type, with its printed face against the table. In order to avoid scratches from forming on the printed back, the table is treated to soften the surface of the table by removing any roughness. For example, the table may be subjected to anodization treatment or it may be coated with Teflon.

In addition, the table of the screen-printing machine may be provided with fast indexing studs which limit the sliding of the sheet on the surface of the table.

Figure 5:
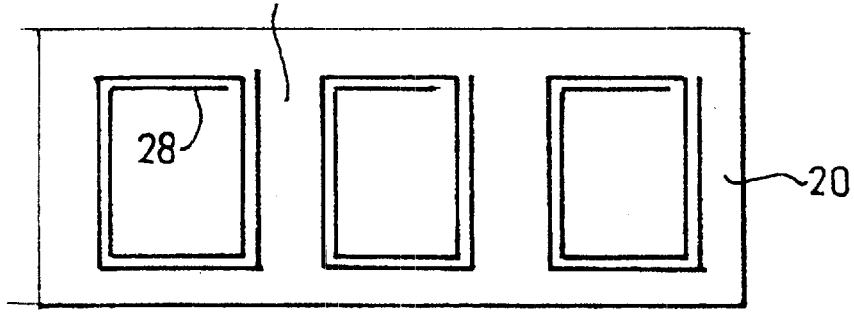
FIG. 5 shows the front of the base sheet after the screen-printing operation.
Figure 6:
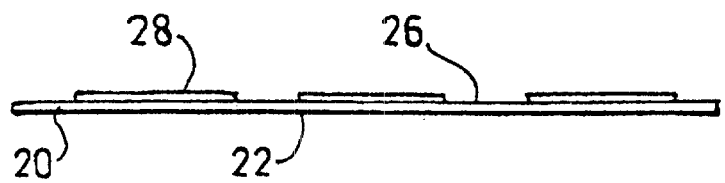
FIG. 6 is a view in profile corresponding to FIG. 5.

During the screen-printing cycle, the conductive ink is transferred from the surface of the screen to the protective sheet in the pattern of the antenna, e.g. in a "square" spiral pattern as shown in FIG. 5.

During this screen-printing stage, for optimum results, it is recommended to control screen-printing parameters that can act to various extents on the quality of the results, such as:

the absence of contact between the screen and the protective sheet;

the speed of screen-printing;

the pressure of screen-printing;

the nature and the configuration of the printing screen; and the nature and the geometry of the squeegees of the screen-printing machine, e.g. by using squeegees made of polyurethane.

The dimensions of the printing screen, e.g. a canvas printing screen, determine the number of antennas that can be formed on the same base sheet 20.

After the screen-printing step, the resulting assembly comprising the sheet and the liquid ink is extracted from the screen-printing machine, and it is transferred to a drying oven, such as an oven known by the trade name "OPTIMA".

On being heated in the oven, the solvent contained in the conductive ink evaporates and the antenna takes up a solid shape made up of conductive particles and of a binder. The drying parameters that can influence the result are:

the temperature of the various zones of the oven;

the drying time; and the flow of air or of nitrogen injected into the oven.

The reproducibility of the antennas, so that they all have the desired properties without deforming the protective sheet on drying, depends on the above parameters. Deformation can be induced by the temperature being too high, or the ink contracting too much.

The meshed mat of the oven is isolated from the protective sheet by a plastic protective plate inserted into the oven at the same time as the protective sheets. The protective plate protects the printed face of the protective sheet from being scratched.

To form this protection, it is also possible to equip the oven with a meshed mat made of a plastic material or a mat that it is treated, or else with belts of plastic tape.

Manufacturing then continues in a known manner so as to manufacture a contactless or hybrid card. A solid connection is formed between the chip or module 12 and the antenna 14 without deforming or damaging the printed face of the protective sheet.

The final operation is that of assembling the chip card by cold rolling or hot rolling or by injection molding under conditions that do not cause the outline of the antenna to show through on the printed face of the protective sheet, which becomes a visible face of the final card.

Good results, free of undulations, have been obtained with the following operating conditions on sheets of PVC or of ABS, or even of paper:

ink: product numbers D5028 or E520 sold by Dupont de Nemours;

optimum ink-drying temperature: about 150° C.;

oven temperature: from 50° C. to 80° C.;

drying time: 3 minutes to 10 minutes.

The method is particularly advantageous on sheets of thickness less than 600 $\mu$m. Good results have been obtained on very thin polymer films of thickness lying in the range of approximately 100 $\mu$m to 15 $\mu$m.

For PC or PET film or sheets, the oven temperature may lie in the range 120° C. to 130° C.

In order to ensure that a zone of the card is reserved for embossing while also retaining the performance of the antenna, which performance is related to its conductivity, the electrical or electronic device of the invention includes turns of unequal widths, between its connection ends.

Good results have been obtained with a width ratio between the widest turns and the narrowest turns that varies in the range of two to five, the narrow value being equal to about 0.5 mm.

Thus, it has been possible, for example, to obtain a chip card provided with an antenna having four turns extending along its lateral edges. It has a narrow zone for the antenna extending to 5 mm from the bottom edge of the card, in which zone four turns of about 0.4 mm are screen-printed, the antenna having a total width of 4 mm at this level. In contrast, along other edges of the card, in particular the opposite edge or the adjacent edge, the card has turns each having a width of about 1.8 mm, the antenna having a width of 8 mm at this level.

This configuration and shape of the antenna further makes it possible to increase the conductivity of a conductive ink or to compensate for its insufficient conductivity, especially when it is partially dried. The effectiveness of radio-wave communications is not affected by this, since an antenna range equal to 8 mm is obtained.

What is claimed is:

1. A method of manufacturing an electronic device having a chip and an interface comprising an antenna, said electronic device including at least one decorative sheet having a visible outside face, said method including the following steps:

printing graphics on the visible outside face of the decorative sheet;

subsequently forming the antenna on a face of the decorative sheet which is opposite said visible outside face by screen-printing a conductive ink that has a metal particle content lying in the range approximately 60% to 95% in a polymer matrix and a solvent; and partially drying the ink at a temperature lower than a predetermined optimum drying temperature.

2. A method according to claim 1, further including the step in which at least one layer of insulating material is disposed on said opposite face of the decorative sheet so as to cover at least part of the antenna.

3. A method according to claim 2, wherein the layer of insulating material is formed by one of the processes of hot-rolling a second sheet, cold-rolling a second sheet, injection-molding or sputtering.

4. A method according to claim 2, further including the step of establishing a connection between the interface and a chip before the layer of insulating material is formed.

5. A method according to claim 2, further including the step of establishing a connection between the interface and a chip after the layer of insulating material is formed.

6. A method according to claim 1, wherein the decorative sheet is made of a polymer material.

7. A method according to claim 1, wherein the ink includes silver particles at a content lying in the range 70% to 85%.

8. A method according to claim 1, wherein said decorative sheet has a thickness of less than 600 μm.

9. A method according to claim 8, wherein said sheet has a thickness lying in. the range of 15 μm to 100 μm.

10. A method according to claim 1, wherein the decorative sheet is made of paper.

11. A method according to claim 1, wherein said screen-printing step is performed on a machine that includes a table which has undergone surface smoothing treatment.

12. A method according to claim 11, wherein said surface smoothing treatment includes anodization.

13. A method according to claim 11, wherein said surface smoothing treatment includes a non-stick coating selected from the group consisting of tetrafluoroethylene fluorocarbon polymers and fluorinated ethylene-propylene resins.

14. A method according to claim 1, wherein said conductive ink is dried in an oven provided with a meshed mat, and a protective plate is inserted between said meshed mat and the screen-printed decorative sheet.

15. A method according to claim 14, wherein the meshed mat is made of a plastic material.

16. A method according to claim 14, wherein the meshed mat is made of stainless steel.

17. A method according to claim 14, wherein the drying oven is provided with belts of plastic tape.

18. A method according to claim 1, further including the initial steps of forming a plurality of antennas simultaneously on a decorative base sheet, and cutting said sheet to obtain a plurality of decorative sheets.

19. The method of claim 1, wherein said decorative sheet comprises at least one of PVC and ABS, and said drying temperature is in a range of 50° C. to 80° C.

20. The method of claim 1, wherein said decorative sheet comprises at least one of PC and PET, and said drying temperature is in a range of 120° C. to 130° C.

* * * * *

UNITED STATES PATENT AND TRADEMARK OFFICE
CERTIFICATE OF CORRECTION

PATENT NO. : 6,595,426 B1 Page 1 of 1
DATED : July 22, 2003
INVENTOR(S) : Olivier Brunet et al.

It is certified that error appears in the above-identified patent and that said Letters Patent is hereby corrected as shown below:

<u>Title page</u>,
Item [30], Foreign Priority Application Data, include the priority information to read -- October 3, 1997 (FR) 97/13734 --

Signed and Sealed this

Fifth Day of October, 2004

JON W. DUDAS
*Director of the United States Patent and Trademark Office*